US008305250B2

(12) United States Patent
Lee

(10) Patent No.: US 8,305,250 B2
(45) Date of Patent: Nov. 6, 2012

(54) APPARATUS AND METHOD FOR REMOTE CONTROLLING

(76) Inventor: Jong Geol Lee, Seoul (KR)

( * ) Notice: Subject to any disclaimer, the term of this patent is extended or adjusted under 35 U.S.C. 154(b) by 412 days.

(21) Appl. No.: 12/670,069

(22) PCT Filed: Jul. 24, 2008

(86) PCT No.: PCT/KR2008/004326
§ 371 (c)(1), (2), (4) Date: Apr. 2, 2010

(87) PCT Pub. No.: WO2009/014385
PCT Pub. Date: Jan. 29, 2009

(65) Prior Publication Data

US 2010/0182187 A1 Jul. 22, 2010

(30) Foreign Application Priority Data

Jul. 26, 2007 (KR) ........................ 10-2007-0075171

(51) Int. Cl.
*H04L 17/02* (2006.01)
(52) U.S. Cl. ........................................ 341/176; 709/223
(58) Field of Classification Search .................. 341/176; 709/223, 205, 217; 307/112; 370/401; 348/564, 348/565
See application file for complete search history.

(56) References Cited

U.S. PATENT DOCUMENTS 6,757,030 B2 6/2004 Umeda
7,624,166 B2 * 11/2009 Foote et al. .................. 709/223

FOREIGN PATENT DOCUMENTS

KR 10-2002-0053893 7/2002
KR 10-2005-0090183 9/2005
KR 10-2006-0080332 7/2006

* cited by examiner

*Primary Examiner* — Joseph Lauture
(74) *Attorney, Agent, or Firm* — Edwards Wildman Palmer LLP

(57) ABSTRACT

An apparatus for remote-controlling an auxiliary device remote-controls easily the auxiliary device used with preset main devices in a conference, a seminar, a lecture, etc. The apparatus a main device remote controller configured to control setting components of the main device, an auxiliary device remote controller configured to control setting components of the auxiliary device, and a controller configured to receive and memorize a first control signal outputted from the main device remote controller, receive a second control signal outputted from the auxiliary device remote controller, and delivers the received first control signal or the second control signal to the main device or the auxiliary device.

15 Claims, 3 Drawing Sheets

APPARATUS AND METHOD FOR REMOTE CONTROLLING

CROSS-REFERENCES TO RELATED APPLICATIONS

This application is a U.S. national phase application, pursuant to 35 U.S.C. §371 of PCT/KR2008/004326, filed Jul. 24, 2008, designating the United States, which claims priority to Korean Application No. 10-2007-0075171, filed Jul. 26, 2007. The entire contents of the aforementioned patent applications are incorporated herein by this reference.

TECHNICAL FIELD

Example embodiment of the present invention relates to an apparatus for remote-controlling an auxiliary device, more particularly relates to an apparatus for remote-controlling easily an auxiliary device used with preset main devices in a conference, a seminar, a lecture, etc.

BACKGROUND ART

Generally, a remote controller or a keyboard is used for controlling setting components, e.g. power source, volume, brightness, channel, screen shift, camera operation, of an auxiliary device used with main devices in a conference, a seminar, a lecture, etc of a company or a school, etc. Here, the main device includes a TV, a VCR, a DVD/CD, a tuner, an audio, a computer, a camcorder, etc, and the auxiliary device has a projector for presentation, an electric screen, a luminary device and so on.

Hereinafter, a common method of controlling the setting components of the auxiliary device will be described in detail.

FIG. 1 is a block diagram illustrating a process of remote-controlling main devices through remote controllers.

As mentioned above, many main devices (e.g. TV, VCR, DVD, tuner, etc) 20 to 20N are used in a conference, a seminar, a lecture, etc.

Each of the main devices 20 to 20N has body section 21 to 21N and control signal receiving section 22 to 22N. Here, the control signal receiving section 22 to 22N is included in corresponding body section 21 to 21N so as to remote-control the above setting components.

In addition, main device remote controllers 10 to 10N are existed in a conference, etc. for the purpose of controlling the main devices 20 to 20N.

Transmission sections 11 to 11N transmit control signals, generated by using a key button (not shown) of the main device remote controllers 10 to 10N, to control signal receiving sections 22 to 22N through an Infrared IR method. Here, the control signal receiving sections 22 to 22N are included in the body sections 21 to 21N of the main devices 20 to 20N. Then, the main devices 20 to 20N set the above setting components in accordance with the transmitted control signals.

On the other hand, the setting may be performed by controlling directly key buttons 23 to 23N of the body sections 21 to 21N.

However, a problem exists in that the setting may not be performed in case that the remote controller is not matched with the main device, i.e. control code of the remote controller is not identical to that of the main device. Accordingly, the remote controller should be placed on the side of corresponding main device, and thus the user may feel uneasy.

DISCLOSURE OF INVENTION

Technical Problem

Accordingly, the present invention is provided to substantially obviate one or more problems due to limitations and disadvantages of the related art.

Generally, to control setting components of main devices and an auxiliary device, the main device is placed in a space in which a control signal of a main device remote controller is transmitted to the main device or a visible space. However, the auxiliary device is placed in a space in which a control signal of an auxiliary device remote controller is not received to the auxiliary device or an invisible space.

Example embodiment of the present invention provides an apparatus and a method of remote-controlling easily setting components of the auxiliary device in the space in which the control signal of the auxiliary device remote controller is not received to the auxiliary device or an invisible space.

Technical Solution

An apparatus for remote-controlling an auxiliary device of a main device according to one example embodiment of the present invention includes a main device remote controller configured to control setting components of the main device; an auxiliary device remote controller configured to control setting components of the auxiliary device; and a controller configured to receive and memorize a first control signal outputted from the main device remote controller, receive a second control signal outputted from the auxiliary device remote controller, and delivers the received first control signal or the second control signal to the main device or the auxiliary device.

The controller includes a mode section configured to select whether or not the controller receives/memorizes the first control signal and the second control signal; a control signal reception/memorization section configured to receive and memorize the first control signal transmitted from a transmission section of the main device remote controller in accordance with selection of the mode section, and receive the second control signal provided from a transmission section of the auxiliary device remote controller without memorizing; a storage section configured to register the first control signal received to the control signal reception/memorization section; a controlling section configured to output a third control signal for selecting the auxiliary device in case that the control signal outputted from the control signal reception/memorization section does not correspond to the control signal registered in the storage section; a display section configured to display status of the controlling section in accordance with control of the remote controllers or extra keyboard; and an interface section configured to deliver the second control signal of the auxiliary device remote controller to a receiving section in a body section of the auxiliary device in accordance with the third control signal outputted from the controlling section.

The display section displays a menu for controlling the setting components of the main device and the auxiliary device through an OSD in case that the controller is turned on.

The display section is included in the controller or is included in a computer or a laptop connected to the controller.

The interface section delivers the first control signal and the second control signal to the receiving section in the body section of the main device and the receiving section in the body section of the auxiliary device, respectively.

A controller for controlling an auxiliary device according to one example embodiment of the present invention includes a control signal reception/memorization section configured to receive a first control signal from a main device remote controller, and receive a second control signal from an auxiliary device remote controller; a storage section configured to register the received first control signal; and a controlling section configured to output a third control signal for selecting the auxiliary device in case that the control signal received to the control signal reception/memorization section does not correspond to the control signal registered in the storage section.

The control signal reception/memorization section memorizes the received control signal, and does not memorize the received second control signal.

The controller further includes a display section configured to display status of the controlling section; and an interface section configured to deliver the second control signal of the auxiliary device remote controller to a receiving section in a body section of the auxiliary device in accordance with the third control signal outputted from the controlling section.

interface section delivers the first control signal to a main device in case that the control signal received to the control signal reception/memorization section corresponds to the control signal registered in the storage section.

A method of remote-controlling an auxiliary device according to one example embodiment of the present invention includes turning on a power of a controller to control setting components of a main device and an auxiliary device; displaying a menu through a display section in case that the power of the controller is turned on; outputting a first control signal or a second control signal through a main device remote controller or an auxiliary device remote controller in accordance with selection of the menu, thereby selecting one of the main device and the auxiliary device; and setting the setting components of the auxiliary device in case that the outputted control signal does not correspond to a control signal preset to the controller.

The method further includes setting the setting components of the main device in case that the outputted control signal corresponds to the control signal preset to the controller.

The display section is included in the controller or is included in a computer or a laptop connected to the controller.

The method further includes controlling to receive and memorize the first control signal, receive the second control signal without memorizing.

A method of remote-controlling an auxiliary device according to another example embodiment of the present invention includes turning on a power of a controller to control setting components of a main device and an auxiliary device; displaying a menu through a display section in case that the power of the controller is turned on; outputting a first control signal or a second control signal through a main device remote controller or an auxiliary device remote controller in accordance with selection of the menu, thereby selecting one of the main device and the auxiliary device; and setting the setting components of the main device in case that the outputted control signal corresponds to a control signal preset to the controller.

The method further includes controlling to receive and memorize the first control signal, receive the second control signal without memorizing.

Advantageous Effects

An apparatus for remote-controlling an auxiliary device of the present invention is used with a main device when a conference, a seminar or a lecture, etc is performed. The apparatus may control setting components of the auxiliary device though the auxiliary device is placed in a space in which a control signal of an auxiliary device remote controller is not received to the auxiliary device or an invisible space.

BRIEF DESCRIPTION OF THE DRAWINGS

Example embodiments of the present invention will become more apparent by describing in detail example embodiments of the present invention with reference to the accompanying drawings, in which.

Figure 1:
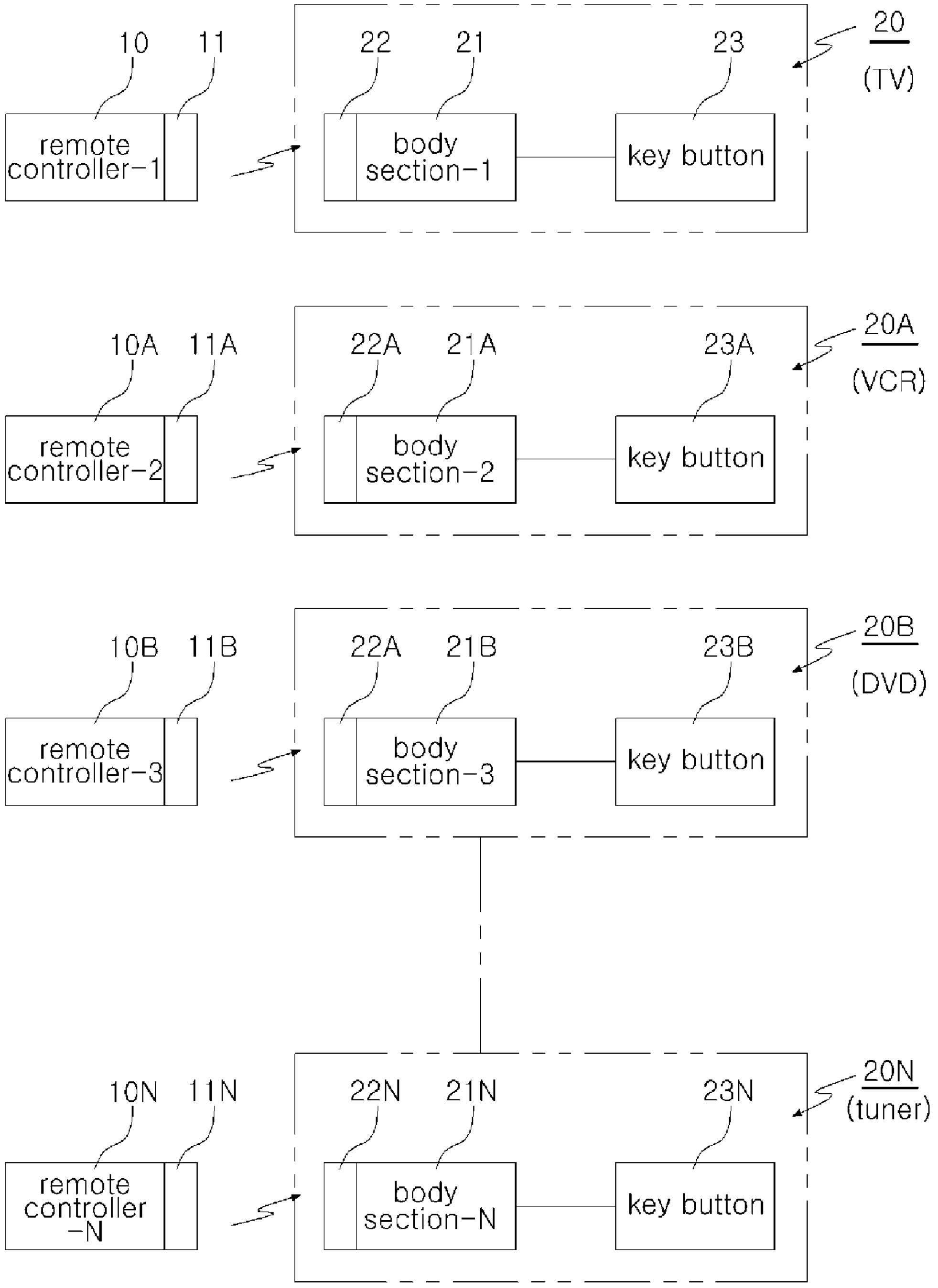
FIG. 1 is a block diagram illustrating a process of remote-controlling main devices through remote controllers.

10 to 10N: main device remote controller 11 to 11N: transmission section

20 to 20N: main device 21 to 21N: body section

22 to 22N: receiving section 23 to 23N: key button

50 to 50N: main device remote controller 51 to 51N: transmission section

90 to 90N: main device 91 to 91N: body section

92 to 92N: receiving section 93 to 93N: key button

60: control signal reception/memorization 61: controlling section section

62: interface section 63: storage section

64: display section 65: keyboard

66: mode section 70: controller

100: auxiliary device remote controller 200K: auxiliary device

201K: auxiliary device body section

MODE FOR THE INVENTION

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising, ", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, an apparatus for remote-controlling an auxiliary device of the present invention will be described in detail with reference to accompanying drawings FIG. 2 and FIG. 3.

Figure 2:
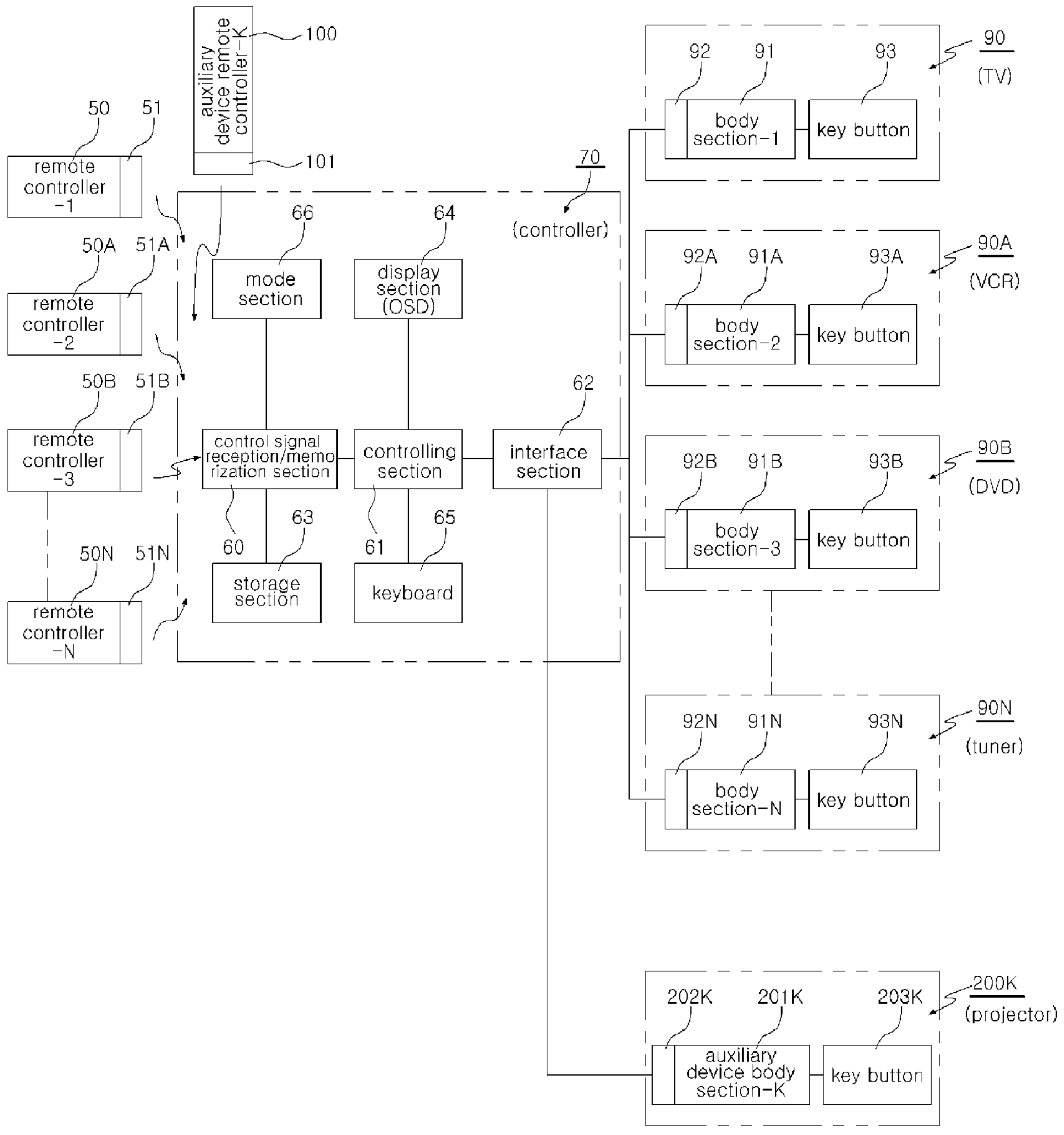
FIG. 2 is a block diagram illustrating a process of remote-controlling an auxiliary device for a main device according to one example embodiment of the present invention.

FIG. 2 is a block diagram illustrating a process of remote-controlling an auxiliary device for a main device according to one example embodiment of the present invention.

The main devices 90 to 90N are generally placed in a first space such as a conference room, an office, a lecture room, etc. where control signals of main device remote controllers 50 to 50N are transmitted to the main devices 90 to 90N.

An auxiliary device 200K is placed in a second space in which a control signal of an auxiliary device remote controller 100 is not transmitted, e.g. a conference room, an office, a lecture room, etc.

The main device remote controllers 50 to 50N for controlling setting components of the main devices 90 to 90N and the auxiliary device remote controller 100 for controlling setting components of the auxiliary device 200K are existed in the first space or the second space.

A controller 70 is placed in the first space or the second space.

Here, the controller 70 receives and memorizes first control signals outputted from the main device remote controllers 50 to 50N, receives the second control signal outputted from the auxiliary device remote controller 100 without memorizing, and delivers the first control signals or the second control signal to the main devices 90 to 90N or the auxiliary device 200K.

Hereinafter, constitution of the controller 70 will be described in detail.

The controller 70 includes a mode section 66 for selecting whether or not the controller 70 receives and memorizes the first control signal and the second control signal. Here, the first control signal controls the main device 90 to 90N, and the second control signal controls the auxiliary device 200K.

The controller 70 further includes a control signal reception/memorization section 60 for controlling to receive and memorize the first control signals transmitted from first transmission sections 51 to 51N of the main device remote controllers 50 to 50N and receive the second control signal provided from a second transmission section 101 of the auxiliary device remote controller 100 without memorizing.

That is, the control signal reception/memorization section 60 does not memorize or register the second control signal outputted from the auxiliary device remote controller 100, wherein the second control signal controls the setting components of the auxiliary device 200K.

The controller 70 further includes a storage section 63 stores (registers) the first control signals, outputted from the main device remote controllers 50 to 50N, memorized by the control signal reception/memorization section 60.

The storage section 63 may be an electrically erasable and programmable read only memory EEPROM, an erasable and programmable read only memory EPROM, a programmable read only memory PROM, or a read only memory ROM, etc.

The controller 70 further includes a controlling section 61 for outputting a fourth control signal for selection of the auxiliary device 200K in case that a control signal outputted through the control signal reception/memorization section 60 is not the first control signal but the second control signal.

This controlling section 61 outputs a third control signal for selecting one of the main devices 90 to 90N in case that the control signal through the control signal reception/memorization section 60 is the first control signal registered in the storage section 63. Here, it is desirable that the controlling section 61 is a micom.

The controller 70 further includes a display section 64 for displaying status of the controlling section 61 through an on screen display OSD in accordance with control of the main device remote controllers 50 to 50N, the auxiliary device remote controller 100 or an extra keyboard 65.

For example, the display section 64 displays status concerning reception and memorization of the control signal selected by the mode section 66, and status concerning the setting components of the main devices 90 to 90N and the auxiliary device 200K, e.g. on/off of a power, a volume level, a channel, a screen brightness, a projector, an electric screen, etc.

It is desirable that the display section 64 displays a menu for controlling the setting components through the OSD in case that the controller 70 is turned on.

The display section 64 may be included in the controller 70, or be included in a computer, a laptop, etc. connected to the controller 70.

The controller 70 further includes an interface section 62 for delivering the second control signal of the auxiliary device remote controller 100 to a second receiving section 202K of an auxiliary device body section 201K in accordance with the control signal outputted from the controlling section 61.

This interface section 62 may deliver the first control signals and the second control signal to first receiving sections 92 to 92N of the main device body sections 91 to 91N and the second receiving section 202K of the auxiliary device body section 201K through a wire communication, respectively.

Figure 3:
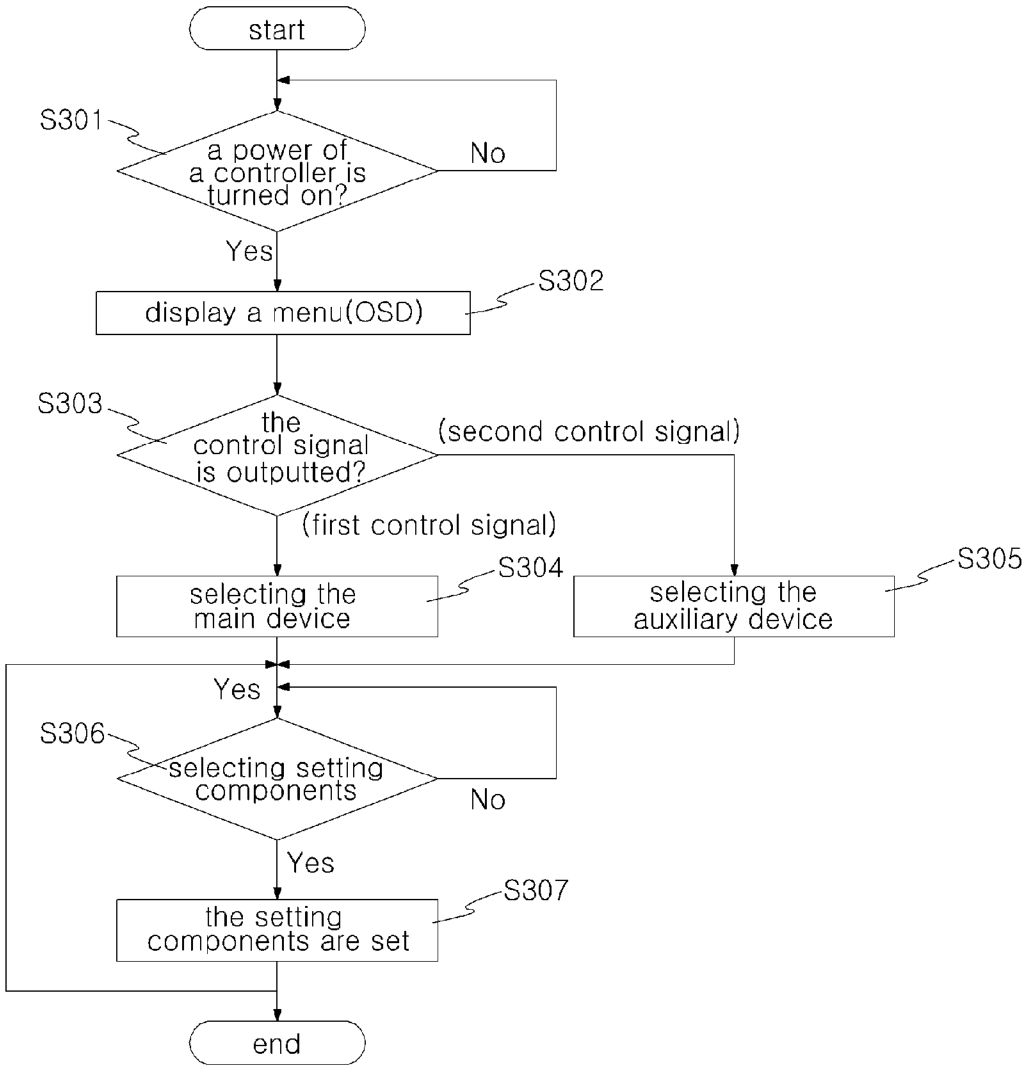
FIG. 3 is a flowchart illustrating a process of remote-controlling the auxiliary device according to one example embodiment of the present invention.

FIG. 3 is a flowchart illustrating a process of remote-controlling the auxiliary device according to one example embodiment of the present invention.

In step S301, a power of the controller 70 is turned on so as to control the setting components of the main devices 90 to 90N and the setting components of the auxiliary device 200K. Here, the controller 70 includes the mode section 66, the control signal reception/memorization section 60, the storage section 63, the controlling section 61, the display section 64, the keyboard 65 and the interface section 62 as mentioned above.

Hereinafter, the control signal reception/memorization section 60 will be described in detail.

The control signal reception/memorization section 60 receives and memorizes the first control signals provided from the first transmission sections 51 to 51N of the main device remote controllers 50 to 50N in accordance with the selection of the mode section 66, and receives the second control signal provided from the second transmission section 101 of the auxiliary device remote controller 100 without memorizing in accordance with the selection of the mode section 66. That is, the control signal reception/memorization section 60 does not memorize or register the second control signal outputted from the auxiliary device remote controller 100, but outputs the second control signal through the interface section 62.

In step S302, the display section 64 displays the menu for controlling the setting components of the main devices 90 to 90N and the auxiliary device 200K in case that the power of the controller 70 is turned on. It is desirable to display the menu through the OSD.

The display section 64 may be included in the controller 70, or be included in a computer, a laptop, etc. connected to the controller 70.

In step S303, the main device remote controller 50 to 50N or the auxiliary device remote controller 100 outputs the first control signal or the second control signal to select one of the main devices 90 to 90N or the auxiliary device 200K in accordance with selection of the menu.

In step S304, the main device 90 to 90N is selected in case that the outputted control signal corresponds to the first control signal stored in the storage section 63. As a result, the setting components of the main device 90 to 90N are selected in step S306, and then the setting components are set in step S307. Subsequently, the steps S306 and S307 are repeatedly performed.

In one example embodiment of the present invention, in case that the setting component to be controlled is not existed after the step S307 is performed, the process may be finished.

In step S305, in case that the outputted control signal corresponds to the second control signal not registered in the storage section 63, the auxiliary device 200K is selected. As a result, the setting components of the auxiliary device 200K are selected in step S306, and then the setting components are set in step S307. Subsequently, the steps S306 and S307 are repeatedly performed.

In one example embodiment of the present invention, in case that the setting component to be controlled is not existed after the step S307 is performed, the process may be finished.

Any reference in this specification to "one embodiment", "an embodiment", "example embodiment", etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure.

More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. An apparatus for remote-controlling an auxiliary device for a main device, the apparatus comprising:

- a main device remote controller configured to control setting components of the main device;
- an auxiliary device remote controller configured to control setting components of the auxiliary device; and
- a controller configured to receive and memorize a first control signal outputted from the main device remote controller, receive a second control signal outputted from the auxiliary device remote controller, and delivers the received first control signal or the second control signal to the main device or the auxiliary device.

2. The apparatus of claim 1, wherein the controller includes:

- a mode section configured to select whether or not the controller receives/memorizes the first control signal and the second control signal;
- a control signal reception/memorization section configured to receive and memorize the first control signal transmitted from a transmission section of the main device remote controller in accordance with selection of the mode section, and receive the second control signal provided from a transmission section of the auxiliary device remote controller without memorizing;
- a storage section configured to register the first control signal received to the control signal reception/memorization section;
- a controlling section configured to output a third control signal for selecting the auxiliary device in case that the control signal outputted from the control signal reception/memorization section does not correspond to the control signal registered in the storage section;
- a display section configured to display status of the controlling section in accordance with control of the remote controllers or extra keyboard; and
- an interface section configured to deliver the second control signal of the auxiliary device remote controller to a receiving section in a body section of the auxiliary device in accordance with the third control signal outputted from the controlling section.

3. The apparatus of claim 2, wherein the display section displays a menu for controlling the setting components of the main device and the auxiliary device through an OSD in case that the controller is turned on.

4. The apparatus of claim 2, wherein the display section is included in the controller or is included in a computer or a laptop connected to the controller.

5. The apparatus of claim 2, wherein the interface section delivers the first control signal and the second control signal to the receiving section in the body section of the main device and the receiving section in the body section of the auxiliary device, respectively.

6. A controller for controlling an auxiliary device, the controller comprising:

- a control signal reception/memorization section configured to receive a first control signal from a main device remote controller, and receive a second control signal from an auxiliary device remote controller;

a storage section configured to register the received first control signal; and a controlling section configured to output a third control signal for selecting the auxiliary device in case that the control signal received to the control signal reception/memorization section does not correspond to the control signal registered in the storage section.

7. The controller of claim 6, wherein the control signal reception/memorization section memorizes the received control signal, and does not memorize the received second control signal.

8. The controller of claim 6, further comprising:

a display section configured to display status of the controlling section; and an interface section configured to deliver the second control signal of the auxiliary device remote controller to a receiving section in a body section of the auxiliary device in accordance with the third control signal outputted from the controlling section.

9. The controller of claim 8, wherein the interface section delivers the first control signal to a main device in case that the control signal received to the control signal reception/memorization section corresponds to the control signal registered in the storage section.

10. A method of remote-controlling an auxiliary device, the method comprising:

turning on a power of a controller to control setting components of a main device and an auxiliary device;

displaying a menu through a display section in case that the power of the controller is turned on;

outputting a first control signal or a second control signal through a main device remote controller or an auxiliary device remote controller in accordance with selection of the menu, thereby selecting one of the main device and the auxiliary device; and setting the setting components of the auxiliary device in case that the outputted control signal does not correspond to a control signal preset to the controller.

11. The method of claim 10, further comprising:

setting the setting components of the main device in case that the outputted control signal corresponds to the control signal preset to the controller.

12. The method of claim 10, wherein the display section is included in the controller or is included in a computer or a laptop connected to the controller.

13. The method of claim 10, further comprising:

controlling to receive and memorize the first control signal, and receive the second control signal without memorizing.

14. The method of claim 13, further comprising:

controlling to receive and memorize the first control signal, and receive the second control signal without memorizing.

15. A method of remote-controlling an auxiliary device, the method comprising:

turning on a power of a controller to control setting components of a main device and an auxiliary device;

displaying a menu through a display section in case that the power of the controller is turned on;

outputting a first control signal or a second control signal through a main device remote controller or an auxiliary device remote controller in accordance with selection of the menu, thereby selecting one of the main device and the auxiliary device; and setting the setting components of the main device in case that the outputted control signal corresponds to a control signal preset to the controller.

* * * * *